(12) United States Patent
De Groot et al.

(10) Patent No.: US 10,514,875 B2
(45) Date of Patent: Dec. 24, 2019

(54) PRINTER CONTROLLER ARRANGED TO CONTROL A PRINT ENGINE, METHOD THEREFORE, AND COMPUTER PROGRAM PRODUCT

(71) Applicant: Océ Holding B.V., Venlo (NL)

(72) Inventors: Michel De Groot, Venlo (NL); Pieter Verduin, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 13 days.

(21) Appl. No.: 16/100,697

(22) Filed: Aug. 10, 2018

(65) Prior Publication Data

US 2019/0065129 A1    Feb. 28, 2019

(30) Foreign Application Priority Data

Aug. 24, 2017    (EP) .................................... 17187641

(51) Int. Cl.
*G06F 3/12* (2006.01)
(52) U.S. Cl.
CPC .......... *G06F 3/1263* (2013.01); *G06F 3/1203* (2013.01); *G06F 3/1212* (2013.01); *G06F 3/1215* (2013.01); *G06F 3/1282* (2013.01); *G06F 3/1288* (2013.01)
(58) Field of Classification Search
None
See application file for complete search history.

(56) References Cited

U.S. PATENT DOCUMENTS

| 7,995,225 B2 * | 8/2011 | Lofthus | H04N 1/00954 358/1.1 |
| 2006/0268318 A1 | 11/2006 | Lofthus et al. | |
| 2013/0208315 A1 * | 8/2013 | Zeng | G06F 3/1211 358/1.15 |

FOREIGN PATENT DOCUMENTS

WO    WO 2012/044320 A1    4/2012

OTHER PUBLICATIONS

European Search Report of application EP 17 18 7641, dated Feb. 22, 2018.

\* cited by examiner

*Primary Examiner* — Paul F Payer
(74) *Attorney, Agent, or Firm* — Birch, Stewart, Kolasch & Birch, LLP (57) ABSTRACT

A printer controller arranged to control a print engine comprising: a print job storage for storing print jobs to be printed; wherein a print job may comprise a deadline, the deadline specifying an ultimate time by which the print job is to be completed; a scheduler module for determining a print execution time for each print job in a sequence of one or more print jobs, the scheduler taking into account a setup time for a print job for setting up the print engine to print the print job given a previous print job; a planning module for determining a print order for to-be-printed print jobs in the print storage, arranged to submit a plurality of sequences of to-be-printed print jobs in the print job storage to the scheduler and in response receive from the scheduler for each sequence of to-be-printed print jobs the print execution times of the print jobs; wherein the planning module elects a sequence of to-be-printed print jobs for which each deadline in a print job in the sequence is met according to the print execution times of the print jobs in the sequence as provided by the scheduler.

15 Claims, 3 Drawing Sheets

PRINTER CONTROLLER ARRANGED TO CONTROL A PRINT ENGINE, METHOD THEREFORE, AND COMPUTER PROGRAM PRODUCT

FIELD OF THE INVENTION

The present invention generally pertains to a printer controller arranged to control a print engine comprising: a print job storage for storing print jobs to be printed, wherein a print job may comprise a deadline, the deadline specifying an ultimate time by which the print job is to be completed; and a planning module for determining a print order for to-be-printed print jobs.

The present invention also pertains to a print system comprising a print engine and further comprising such a printer controller.

The present invention also pertains to a method for determining a print order for a plurality of print jobs, wherein a print job may comprise a deadline, the deadline specifying an ultimate time by which the print job is to be completed.

The present invention pertains as well to a computer program product embodied on a non-transitory computer readable medium that, if executed on a processor, performs such method.

BACKGROUND ART

Production printers comprise a print engine for depositing marking material on media in accordance with an image to be printed, and a printer controller for controlling the print engine and performing higher level functions in relation to the print jobs to be printed.

Print jobs submitted to the printer are typically not immediately queued for printing, but are initially placed in a waiting area. A printer operator typically manually plans the order in which the print jobs are to be printed by placing the received print jobs in a specific order in a print queue. The printer controller has the print engine print the print jobs in the order they have been arranged in the print queue.

Print jobs usually have deadlines assigned to them, although in many print systems the deadlines are not readily available, and it is up to a printer operator and a separate administration system to make sure print jobs are printed in time to meet the deadlines.

A common way to do this is to have a planner working in an administrative department assign batches of print jobs to printer operators or groups of printer operators which batches have to be completed as a whole by a certain time (for example end of shift) in order to make sure that all print jobs have been completed by their individual deadlines. Such an approach may work if the pressure is generally not too high. However, at the end of the year it is not uncommon for many professional printing companies to run near maximum production capacity and even then rush jobs come in that need to be fit in, which in general results in ad hoc planning and stress.

Print systems that do explicitly support deadlines typically employ an earliest-deadline-first algorithm to deal with deadlines. If all deadlines can be met, such an algorithm generally suffices. However, if not all deadlines can be met, compromises must be sought and often manually. Furthermore, even if all deadlines can still be met, the earliest-deadline-first algorithm may not provide the most optimal solution. Print jobs are printed with specific print settings which are defined in a job ticket. If a first print job requires different print settings than a second print job, the print settings have to be changed between the two print jobs. Some print settings can be changed instantaneously. However, changing other print settings requires a setup time. For example, in an ink jet printer, during printing the print head is very close to the printing surface (the media whereupon the print head is printing), but should not touch it. If the thickness of the media being printed on has to change, the height of the print head has to be changed. Many printers further require that no media passes under the print head while the height is being adjusted. It takes time to stop the supply of media, move the print head, and start the supply of media again.

Therefore, switching from the print settings of a first print job to the print settings of a second print job may take time (half a minute is not uncommon). Therefore, the order wherein a number of print jobs are printed actually affects the total print execution time for the print jobs. An earliest-deadline-first algorithm may therefore pick an order that is not the most efficient order.

It is an object of the present invention to improve over the described prior art.

SUMMARY OF THE INVENTION

In a first embodiment of the present invention, a printer controller is provided arranged to control a print engine comprising: a print job storage for storing print jobs to be printed, wherein a print job may comprise a deadline, the deadline specifying an ultimate time by which the print job is to be completed; a scheduler module for determining a print execution time for each print job in a sequence of one or more print jobs, the scheduler taking into account a setup time for a print job for setting up the print engine to print the print job given a previous print job; a planning module for determining a print order for to-be-printed print jobs in the print storage, arranged to submit a plurality of sequences of to-be-printed print jobs in the print job storage to the scheduler and in response receive from the scheduler for each sequence of to-be-printed print jobs the print execution times of the print jobs; wherein the planning module elects a sequence of to-be-printed print jobs for which each deadline in a print job in the sequence is met according to the print execution times of the print jobs in the sequence as provided by the scheduler.

Not every print job necessarily has a deadline. Print jobs without a deadline may be scheduled at an arbitrary time from their own perspective. However, print jobs without a deadline do still contribute to the total execution time. Furthermore, their position in the print queue will also influence the total execution time as differences in print job settings between such a print job and a preceding print job or subsequent print job may result in a setup time that also contributes to the total execution time.

The print execution time determined by the scheduler may be an absolute time, defining a moment in time an individual print job will start and end (preferably taking into account print jobs already in the print queue and being printed) or relative time, defining the length of the time period required for a print job.

The plurality of sequences may comprise every unique ordering (permutation) of print jobs. Alternatively, the plurality of sequences is a limited number of permutations that have been determined based on a rough estimate of execution times or heuristics. In such a case the scheduler is used to determine a more accurate estimation of the actual execution times and elect the most appropriate sequence.

Electing does not necessarily mean that the elected sequence is the actual sequence wherein the print jobs are queued and printed. The elected sequence may as well be a suggested sequence. The suggested sequence may be accepted by an operator, or be modified by the operator.

The deadline of a print job is not necessarily equal to the deadline of a corresponding customer order, as post-processing may be required after printing the print job, such as offline finishing operations, packaging and shipping operations. Therefore, the deadline of a print job may be automatically or manually set prior to the deadline of the corresponding customer order to account for such activities.

According to a further embodiment of the present invention, a printer controller is provided wherein the previous job of the first print job in the sequence is: the print job currently being printed by the print engine; the last print job of the sequence of print jobs already planned for printing; or the last printed print job if the print engine is idle. This advantageously allows to take into account the setup time required to change from the printer engine state right before the printer engine starts preparing for printing the first print job in the sequence to the printer engine state required for the first print job. This is determined by the print job settings of the first print job and the print job settings of its preceding print job.

According to another embodiment of the present invention a printer controller is provided, wherein, if none of the sequences of print jobs meets all of the deadlines of its print jobs, the planning module elects a sequence with the maximum number of deadlines met. This deals with the case that no matter which sequence is elected, the deadline of at least one print job cannot be met. (This may be a different print job for different sequences.) By electing a sequence with the maximum number of deadlines met (equivalent to a sequence with the minimum number of deadlines not met), the controller mitigates the damage.

In a further embodiment according to the present invention a printer controller is provided wherein a print job has assigned to it: a criticalness property of the print job, and/or a weight of the print job; and wherein, if none of the sequences of print jobs meets all of the deadlines of its print jobs, the planning module elects a sequence with: the deadlines met by all print jobs designated as critical, the maximum sum of the weights of the print jobs with a deadline met, the minimum sum of the weights of the print jobs with a deadline not met, and/or the minimum sum of the weighted overdue times of the overdue print jobs. As a print job being delivered too late may not have similar consequences for each print job, designating a print job as critical or assigning weights to print jobs allows the printer operator to have the printer controller help determine a sequence of print jobs with the least unfavourable outcome.

According to a further embodiment of the invention, a printer controller is provided wherein at least two print jobs have a group identifier assigned to it in order to group the at least two print jobs, and wherein the planning module: only submits to the scheduler module sequences of to-be-printed print jobs wherein the at least two print jobs forming a group are consecutive print jobs in the sequence, and/or electing comprises electing a sequence of to-be-printed print jobs with the maximum number of groups of grouped print jobs having all their print jobs meeting their deadlines according to the print execution times of the print jobs in the sequence as provided by the scheduler. Often a number of print jobs need to be handles as a group, for example because they are for one and the same customer or are even part of a single customer order. The printer operator may want to keep those print jobs together, for example because they need to be post-processed together or shipped together. Furthermore, if multiple groups of print jobs need to be shipped as their respective groups under tight or infeasible deadlines, it is of no use to attempt to minimize individual overdue times for print jobs, as this may result in two or more groups being shipped overdue, while it would have been possible to limit all overdue print jobs to a single group resulting in only a single shipment being overdue. By taking into account a group identifier, the planner module can account for this and elect a sequence with the minimum number of groups of print jobs having an overdue print job.

In again a further embodiment according to the present invention, a printer controller is provided wherein the planning module determines which deadlines or combination of deadlines are impossible to meet. This provides the printer operator with further means to find a sequence which results in the least unfavourable outcome. If it is a single deadline that is impossible to meet, the operator has not much choice but at least becomes aware of the situation. If it is a combination of deadlines, say either deadline A will not be met or alternatively deadline B will not be met, but at least one of these cannot be met no matter what sequence is chosen, the operator has a simple choice which deadline he chooses not to meet without going through a potentially long list of sequences, none of which meets all deadlines, to find the sequence which is the least unfavourable. In such a scenario the operator can do conflict resolution, for example by deciding ad hoc on properties such as the criticalness of the deadline of a print job or the weight to assign to a print job or simply electing the print job to favour leaving election of the proper sequence to the controller. Furthermore, he only has to do this for print jobs that are mutually exclusive with regard to meeting the deadline. If the deadlines of other print jobs will be met anyway, there is no specific need to assign a "criticalness" property of weight to their deadlines.

According to another embodiment, the present invention provides a printer controller, wherein the election by the planning module comprises as a secondary election criteria the sequence with the lowest total print execution time or the lowest sum of (optionally weighted) overdue time. This is a further optimalisation to decide between sequences that meet the primary election criteria equally.

The present invention also provides a print system comprising a print engine for forming an image on a media by depositing marking material on the media, the print system further comprising a printer controller as described above, wherein the printer controller is connected to the print engine and is arranged to provide a raster image to be printed to the print engine and to control the print engine in order to have the print engine form the image on the media.

In an aspect of the present invention, a method is provided for determining a print order for a plurality of print jobs, wherein a print job may comprise a deadline, the deadline specifying an ultimate time by which the print job is to be completed, the method comprising: determining a plurality of sequences for the plurality of print jobs; for each sequence in the plurality of sequences, determining for each print job in the sequence a print execution time, taking into account a setup time for a print job for setting up the print engine to print the print job given a previous print job; electing a sequence of to-be-printed print jobs for which each deadline in a print job in the sequence is met according to the determined print execution times of the print jobs of the sequence.

In another aspect of the present invention, a method is provided wherein the previous job of the first print job in the sequence is: the print job currently being printed; the last print job of the sequence of print jobs already planned for printing; or the last printed print job.

In again another aspect of the present invention, a method is provided, wherein, if none of the sequences of print jobs meets all of the deadlines of its print jobs, electing comprises electing a sequence with the maximum number of deadlines met.

In a further aspect of the present invention, a method is provided wherein a print job has assigned to it: a criticalness property of the print job, and/or a weight of the print job; and wherein, if none of the sequences of print jobs meets all of the deadlines of its print jobs, electing comprises electing a sequence with: the deadlines met by all print jobs designated as critical, the maximum sum of the weights of the print jobs with a deadline met, the minimum sum of the weights of the print jobs with a deadline not met, and/or the minimum sum of the weighted overdue times of the overdue print jobs.

In another aspect of the present invention a method is provided further comprising determining which deadlines or combination of deadlines are impossible to meet. Determining which deadlines or combination of deadlines are impossible to meet may comprise determining which deadlines are not met in any of the sequences submitted. The present invention further provides a method wherein the election comprises as a secondary election criteria the sequence with the lowest total print execution time or the lowest sum of overdue time.

In one particular embodiment of the present invention a computer program product is provided embodied on a non-transitory computer readable medium that, if executed on a processor, performs the steps of one of the method above.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF THE DRAWINGS

The present invention will now be described with reference to the accompanying drawings, wherein the same reference numerals have been used to identify the same or similar elements throughout the several views.

A typical reprographic apparatus (FIG. 1) such as a printer generally comprises a controller 110 and an engine 120.

Figure 1:
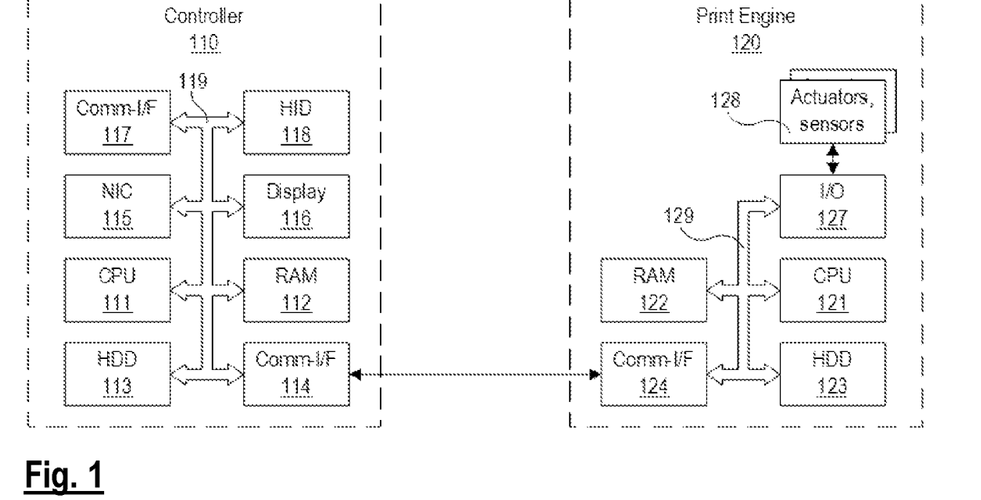
FIG. 1 is a block diagram showing the components of a general printer to which the invention may be applied.

The engine 120 is responsible for low-level control of the apparatus. It deals with individual hardware components that are responsible for the reprographic process such as drives for media transport, media detectors (in the media path as well as in the input and output media trays), path switches, fusers, print heads, etc.; in general actuators and sensors 128. These actuators and sensors are connected through input/output (I/O) boards 127 to a bus 129. The bus 129 connects the major components in the engine 120. Actual data processing takes place in a central processing unit (CPU) 121. The CPU 121 reads sensor values from the sensors 128 through the I/O 127. Based on these sensor values and other data such as print data and print commands received from the controller 110, the CPU 121 determines how the engine 120 should respond to this information and determines appropriate actuation values that are sent through the I/O 127 to the actuators 128. The engine 120 comprises a volatile memory such as a random access memory (RAM) 122 to temporarily store data for processing such as the print data and print commands received from the controller 110, and the sensor values read from the sensors 128. Furthermore, a non-volatile memory such as a hard disk drive (HDD) 123 serves to store data in a more permanent manner, for example to survive a power down of the system. This hard disk drive 123 typically also stores embedded software comprising computer instructions that are run on the CPU 121. The engine 120 typically runs a real-time Operating System (RTOS), for example a soft real-time Operating System in order to deal with the time critical functions of controlling the actuators 128. The engine 120 further comprises a communication device 124 to communicate with the controller 110. Typically, the engine 120 receives print data and print commands from the controller 110 and provides back status information on the engine 120 itself and on the processing of the print commands and print data, including sending error messages to the controller 110.

The controller 110 is connected to the engine 120 through a communication device 114 that communicates with the communication device 124 of the engine 120. These communication devices 114, 124 may be implemented as Ethernet network interface controllers (NIC). Processing in the controller 110 is done by a CPU 111 that is connected to all the other components in the controller 110 through a bus 119. The data to be processed is temporarily stored in a volatile memory such as RAM 112, while data is stored in a more permanent manner in a non-volatile memory such as hard disk drive 113, for example in order to survive power downs, but also to relieve the volatile memory 112 which typically has a smaller storage size. The hard disk drive 113 typically stores print jobs, each comprising print data and a job ticket. Furthermore, the hard disk drive 113 comprises converted print data which is print data converted to a format suitable for processing by the engine 120. Typically the converted print data comprises raster images. Converting the print data in the print jobs to converted print data is typically done in a Raster Image Processor (RIP). Although the RIP may be a dedicated hardware device, it is common to be implemented in software and running on CPU 111. As the RIP-process is rather computationally intensive, it is common for controllers 110 to have multiple processing units in the form of a multi-core CPU 111 or multiple CPUs 111. The controller 110 further comprises a display 116 to show messages to an operator, or display a complete graphical user interface (GUI) to an operator for operating the reprographic apparatus. The display 116 is supplemented by a human interface device (HID) 118 such as a keyboard, mouse, touchpad, stylus, or touch sensitive panel integrated into display 116, and allows the operator to operate the reprographic apparatus. The controller 110 comprises a communication interface 117 for communicating with peripheral devices such as finisher, for example, stackers, staplers, binders, punchers, cutters, trimmers, folders, media input units, etc. The controller 110 further comprises a network interface card (NIC) 115 to connect the controller 110 to a computer network. Through the network connection, print jobs may be submitted to the controller 110 and the results of scan jobs may be retrieved from the controller 110. For these operations the controller 110 may be directly in communication with individual workstations, or indirectly through a print server. Furthermore, the network connection may be used to remotely operate the reprographic apparatus, monitor its status, and send production data to monitoring systems, accounting systems, or business information systems. Note that in smaller printer models, specifically printers suitable for placement on desks, it is common to use communication interfaces such as USB, FireWire, or Bluetooth instead of the NIC 115.

The controller 110 and the engine 120 may be implemented in a single printer device (typical for smaller printers for low volume printing), or as two separate, but interconnected devices (typical for larger, high-volume production printers).

The engine 120 typically deals with print data on a sheet level, swath level, or even line level. The engine 120 is typically not aware of information on a document or even job level. In contrast the controller 110 typically receives print jobs comprising one or more documents, the documents typically comprising multiple pages.

With regard to determining a print order, consider three print jobs 210, 220, 230 (FIG. 2) identified as jobs 1-3 by their job identifiers 212, 222, 232. All three print jobs specify an identical first print job setting A (214, 224, 234), but with different values. Print jobs 1 and 3 (210, 230) define a value $A_1$, while print job 2 (220) defines a value $A_2$.

Figure 2:
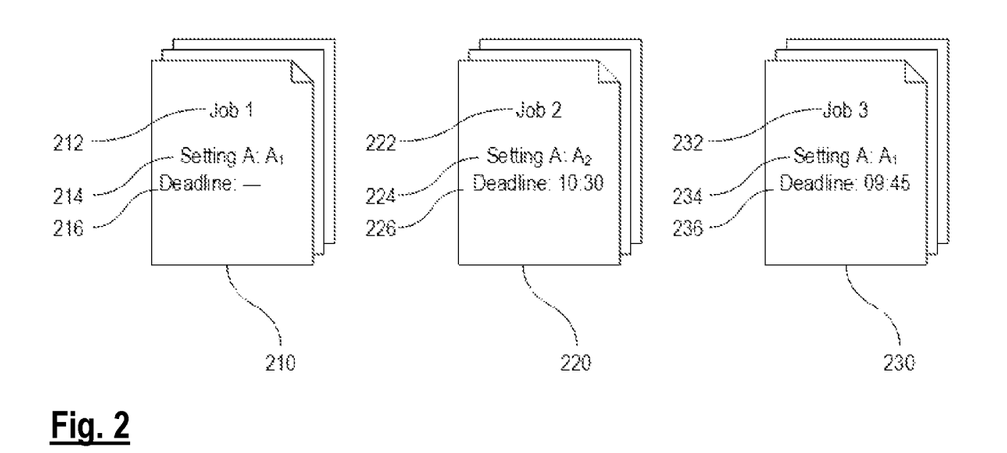
FIG. 2 schematically shows three print jobs to be scheduled in accordance with the present invention.

Furthermore, two of the print jobs, namely print jobs 2 and 3 (220, 230) specify a deadline (216, 226, 236). Print job 2 (220) specifies a time '10:30' as deadline (226), while print job 3 (230) specifies a time '09:45' as deadline (236). A deadline would typically not only specify a time, but a time and date. However, for the sake of brevity, only time is shown inhere. Print job 1 (210) does not specify a deadline. Not specifying a deadline may happen explicitly or implicitly. The absence of a deadline may explicitly be specified by the job ticket including a deadline property, but specifying a specific value dedicated to signal the absence of such a value, such as a 'null' or 'nil' symbol as used in many formal languages (SQL, C, Python, etc.) The absence of a deadline may be implicitly specified by the deadline specification actually being omitted. FIG. 2 explicitly specifies the absence of a deadline for print job 1 (210) by explicitly specifying an em-dash (—) as value (216).

When a sequence of print jobs (210, 220, 230) is printed, the print execution time of a current print job 312 (FIG. 3) is not only affected by the print job settings of the current print job 312 itself, but also by the print job settings of the previous print job 311. If a previous print job required different print settings than the current print job requires, the print settings have to be changed between the two print jobs. Some print settings can be changed more-or-less instantaneously. However, changing other print settings may require a non-neglectable setup time.

As already discussed, the thickness of the media being printed determines the height of the print head in an inkjet printer and changing media may require changing the print head height position which takes time as the print head has to be moved physically. As a further example, in electrophotography printers, the temperature of the fuser required to fuse the toner to the media depends on the thickness of the media due to the thermal capacity of the media. However, the temperature of the fuser can not instantaneously change as the fuser itself has a thermal capacity (by design). Therefore, just like with ink jet printers, an electrophotography printer needs time to switch between media of differing thickness. As a last example, in many printers changes in the media transport such as including a duplex loop for duplex printing or excluding the duplex loop, or changing the transport speed requires the paper path (the routes of the media inside the printer) to be emptied before such a change can be performed. Emptying the paper path can take considerable time, especially for large production printers where the paper path may have a length corresponding to tens of media sheets.

Figure 3:
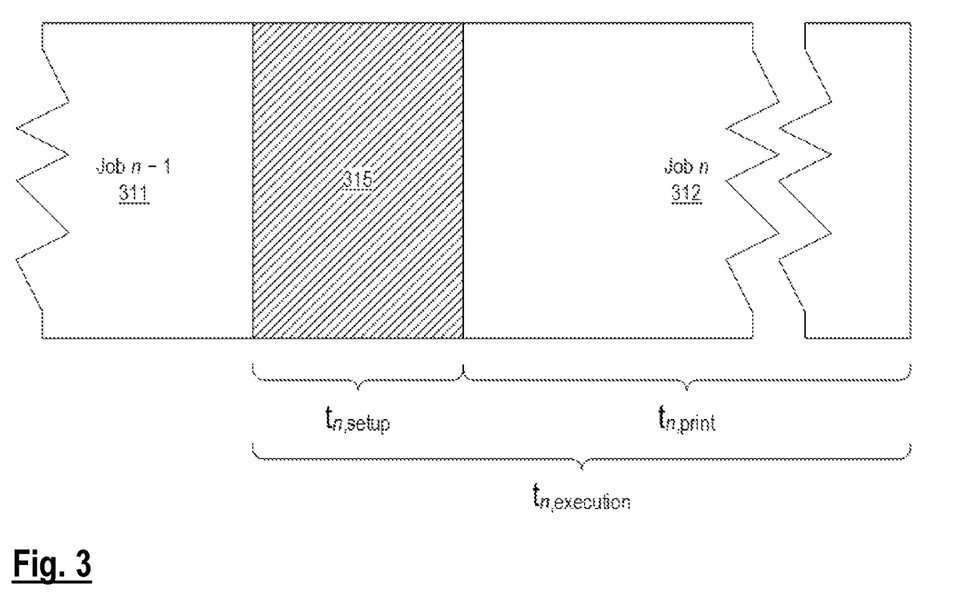
FIG. 3 schematically explains the timing as dealt with in the present invention.

The setup time for the current print job 312 is illustrated in FIG. 3. Before the current print job 312 was printed, the previous print job was printed according to its own set of print settings that were specified in the print ticket of the previous print job 311. The printing of the previous print job 311 extends in time and the start of the previous print job 311 is not shown in FIG. 3 as visualized by the break on the left. At some point in time previous print job 311 is completed. However, the print job settings for the current print job 312 as specified in the job ticket of the current print job 312 are not identical to the print job settings of the previous print job 311. Even worse, it will take the print engine 120 some time to prepare printing the current print job 312. The time required for the print engine 120 to make the necessary preparations is denoted as the setup time for the current print job 312. The print engine setup is denoted by the hatched block 315. Furthermore, variable $t_{n,\ setup}$ denotes the duration of the print engine setup 315 for print job n. After the print engine 120 is finished setting up for the current print job 312, the setup ends, and the printing of the current print job 312 starts. The actual printing of the current print job 312 follows the setup 315 and is denoted by the broken rectangle 312. The break visualizes that a compressed time scale is shown as the duration of a print job 312 is typically longer that the duration of a job's setup 315. The duration of the actual printing of the current print job 312 is denoted by the variable $t_{n,\ print}$. The print execution time $t_{n,\ execution}$ of a print job n is the sum of the setup time $t_{n,\ setup}$ of the print engine setup 315 of a print job 312 and the print time $t_{n,\ print}$ of the print job 312. Note that the start of the setup 315 is the moment the print engine 120 starts making changes in order to process the current print job 312. Although FIG. 3 suggests that the start of the setup 315 coincides with the completion of the previous print job 311, there might in practice be some overlap. This depends on the actual capabilities of the print engine 120 and the type of print settings the print engine 120 actually has to change. For example, although typically the print head height in an inkjet printer is not changed while media passes underneath, the print engine might be able to change the print head height as soon as a sheet is passed the print head (or typically passed a media sensor that is located downstream of the print head). So the last media sheet of the previous print job 311 may still be in the process of being conveyed from the print head to the media output tray, while the print engine already starts making changes to print the current print job 312, for example by changing the height of the print head. In the explanations inhere it is assumed for the sake of clarity that printing and setup does not overlap. However, if it does in reality, only the additional (non-overlapping) setup time is to be taken into account. This applies to overlap between the setup time $t_{n,\ setup}$ and the print time $t_{n-1,\ print}$ of the preceding print job 311, but also to the setup time $t_{n,\ setup}$ and the print time $t_{n,\ print}$ of the current print job 312.

Figure 4:
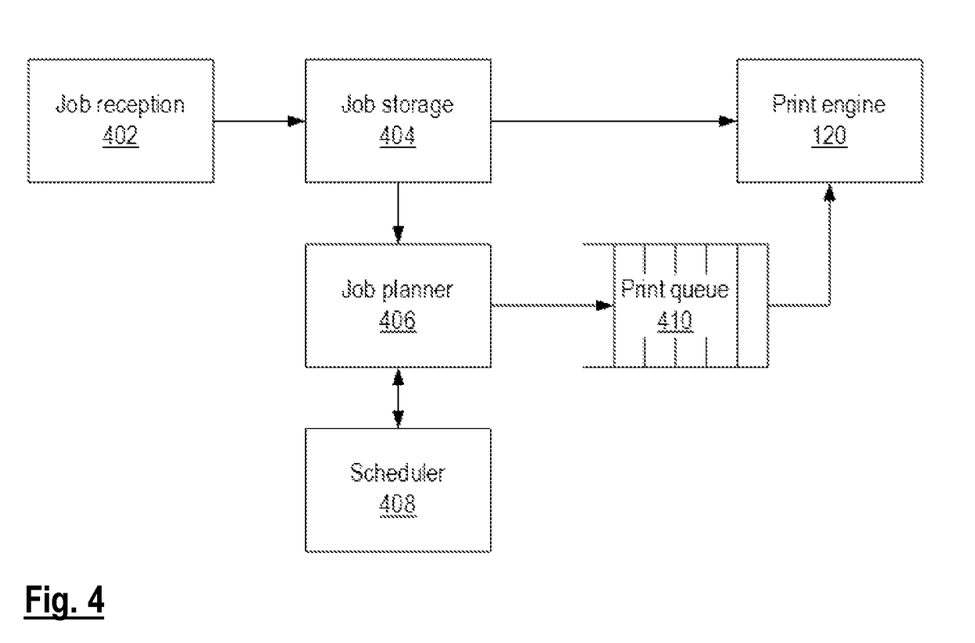
FIG. 4 is a block diagram showing an implementation of the present invention.

A preferred implementation of the present invention comprises a job reception module 402 (FIG. 4). The job reception module 402 may receive a print job over a computer network from a job submitter, such as a printer driver installed in a remote workstation (not shown). The print job is stored in a job storage 404, typically a persistent storage such as a hard disk 113 of the controller 110. The job planner 406 is responsible for planning the print jobs. The job planner 406 may automatically plan and queue print jobs for printing, but might also determine a planning and suggest the planning to a printer operator allowing the printer operator to accept the suggested planning, reject the planning, or manually modify and accept the modified planning. Furthermore, the job planner 406 may suggest more than one alternative planning and present these alternative plannings to the printer operator to accept one or again take one of the suggested alternative plannings as a starting point, modify the suggested alternative planning, and accept the modified, suggested alternative planning.

In order to determine such a planning, the job planner determines a plurality of print sequences for the print jobs and submits these sequences of print jobs to the scheduler 408. The scheduler 408 determines for each print job in a sequence the print execution time $t_{n,\ execution}$. The print execution time $t_{n,\ execution}$ may be determined by the scheduler 408 in different ways. For example, the scheduler 408 may comprise a nominal print execution time per media sheet for given print job settings. Furthermore, it may comprise a table with setup times for changing from a first value of a print setting to a second value (for example a setup time for changing from a duplex configuration to a simplex configuration). By way of lookup tables and mathematical additions and multiplications the scheduler 408 is able to work out a print execution time $t_{n,\ execution}$ for a current print job 312. In a more preferred embodiment, the scheduler 408 has access to a model of the paper path of the print engine 120 (optionally also including other time influencing elements such as a fuser in an electrophotography print engine).

Note that in order to correctly estimate the setup time $t_{n,\ setup}$ for the first print job in the sequence of print jobs, the scheduler 408 needs access to the state of the print engine 120 at the moment the sequence of print jobs is to be started. This state may be the current state of the print engine 120 if the print engine 120 is idle and waiting for print jobs to print. However, the print engine may already be busy printing already planned print jobs. In that case, the state of the print engine 120 at the moment the sequence of print jobs is to be started will be the state of the print engine 120 at the completion of the print jobs currently planned.

The print job settings of the preceding print job may be provided to the scheduler 408 in the form of an initial state describing the state of the print engine 120 at the start of the sequence of print jobs, for example a current print engine state when the print engine 120 is currently idle, or alternatively in the form of print job settings for a preceding print job. Alternatively, the preceding print job of the sequence is simply included itself in the sequence as the first print job of the sequence. This way, the scheduler 408 will calculate a setup time $t_{n,\ setup}$ and a print time $t_{n,\ print}$ for the print jobs in the sequence. The setup time $t_{n,\ setup}$ determined by the scheduler 408 for the first print job setup (actually the preceding print job) may be incorrect and meaningless, but the setup $t_{n,\ setup}$ and the print time $t_{n,\ print}$ of the preceding print job may be discarded anyway as the preceding print job was only included in the sequence to provide the scheduler 408 with the print job settings of the preceding print job of the actual sequence.

Once, the scheduler 408 has determined the setup times $t_{n,\ setup}$ and print times $t_{n,\ print}$ for the print jobs in the sequence, and this has been done for each sequence of the plurality of sequences, the job planner 406 determines which sequences actually meets all deadlines of the print jobs in the sequence. If there is at least one sequence that only comprises print jobs that meet their respective deadlines, than the planner 406 will select the sequence with the shortest total print execution time.

The print jobs of the selected sequence will then be queued for printing in the print queue 410 in the order specified by the selected sequence.

The controller 110 will handle all print jobs in the order they are queued in the print queue 410. If the print engine 120 is idle or becomes idle, the controller 110 fetches the print job at the head of the print queue 410. It will retrieve the job specification from the job storage 404 and start processing the print job. While processing the print job raster images that have been prepared by a raster image processor for the print job are retrieved from a RIP storage and provided to the print engine 120 for printing.

If the job planner 406 determines that there are only sequences that fail to meet at least one deadline, the controller 110 informs the printer operator that not all deadlines can be met. The controller 110 may than provide suggested alternatives to the printer operator. For example, it may suggest the sequence that leads to the least number of failed deadlines, or it may suggest the sequence that leads to the lowest amount of total overdue time. The overdue time is the amount of time a print job in a sequence will be completed later than the specified deadline. Furthermore, the controller 110 may allow the printer operator to assign hard or soft constraints to the deadlines, for example the printer operator may indicate which print job deadlines are critical, telling the planner 406 that at least those deadlines should be met, or the printer operator may assign weights to the print job deadlines indicating a relative importance. The planner 406 may then select the sequence where the sum of weights of deadlines not met is minimal, the sum of weights of deadlines met maximal, or the total of weighted overdue time is minimal. Furthermore, the job planner 406 may use a combination of these criteria. Such combinations may be direct combinations, or may be combinations in the form of primary selection criteria and secondary selection criteria (tie-breaker criteria).

Figure 5:
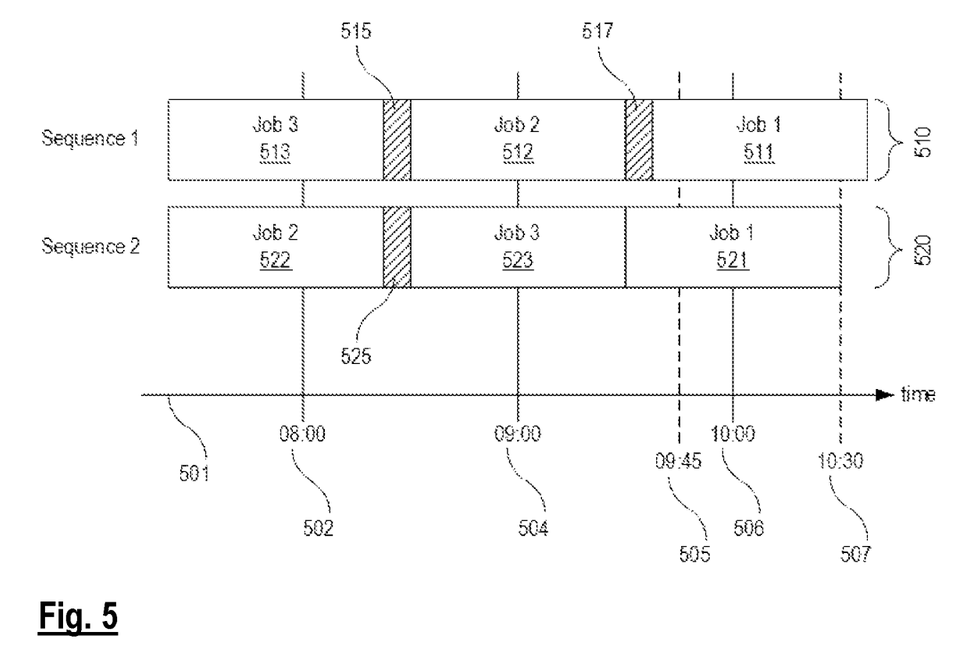
FIG. 5 schematically shows the result of applying the present invention to the three print jobs of FIG. 2.

An example of planning according to the present invention is depicted in FIG. 5. The print jobs 210, 220, 230 of FIG. 2 are planned. In this diagram time increases to the right according to the time axis 501. Labels 502, 504, 506 show example times at the respective positions along the time axis.

According to a first sequence 510 the well-known earliest-deadline-first algorithm is applied. The deadlines of the print jobs 1, 2, and 3 (210, 220, 230) are respectively none, 10:30, and 09:45. According to the earliest-deadline-first algorithm the print jobs should be printed in the order print job 3 (230) first as the deadline is 09:45, then print job 2 (220) as the deadline is 10:30, and print job 1 (210) last as it has no deadline. The first sequence shows a timing for these jobs in this particular order. Print job 3 is printed as the first planned job 513, then print job 2 as the second planned job 512, and print job 1 as the last planned print job 511. Between the first planned print job 513 and the second planned print job 512, a setup period 515 is required as print job 3 (230) uses a print job setting $A_1$, whereas the next print job, print job 2 (220) uses a print job setting $A_2$. A similar situation occurs after the completion of print job 2 (220) which uses print job settings $A_2$. The print engine 120 has to adapt to the print job settings $A_1$ as specified by the last print job 511, print job 1 (210). This adaption requires a setup period 517.

The deadlines of the print jobs are all met: print job 3 (230) has a deadline of '09:45' and finishes well before the '09:45' deadline mark 505, print job 2 (220) has a deadline of '10:30' and also finishes well before the '10:30' deadline mark 507, and print job 1 does not have a deadline.

A second sequence 520 orders the print jobs slightly differently: the first planned print job 522 is print job 2, the second planned print job 523 is print job 3, and the last planned print job 521 is print job 1.

According to the second sequence 520, all print job deadlines are also met: print job 2 (220) has a deadline of '10:30' and finishes before the '10:30' deadline mark 507 (even before the '09:45' deadline mark 505), print job 3 (230) has a deadline of '09:45' and finishes a bit before the '09:45' deadline mark 505, and print job 1 (210) again does not have a deadline.

Both sequences 510, 520 meet all deadlines. However, the second sequence 520 is preferable over the first sequence 510 (according to the earliest-deadline-first algorithm) as it takes less time to execute. This is caused by the print jobs 2 and 3 (220, 230) being swapped compared to the scheduling of the earliest-deadline-first algorithm. The swapping resulted in the jobs 1 and 3 (210, 230) now being consecutive. Because these two jobs require the same print job settings $A_1$, the setup period 517 is avoided, resulting in a shorter overall execution time. The setup period 525 between job 2 and job 3 is unavoidable as there are simply two subsets of print jobs in the whole set of print jobs that have different print job settings which require at least one setup period when switching from printing the first subset to the second subset.

If the typical number of print jobs to be scheduled is low the job planner 406 may simple submit all permutations of the print jobs as sequences to the scheduler 408. However, with increasing numbers of print jobs and especially when the scheduler uses a complex model to estimate the setup times $t_{n,\ setup}$ and the print times $t_{n,\ print}$ for the sequences, submitting all permutations may result in the scheduler 408 requiring an amount of time to calculate the results that is undesirable. In such cases the job planner 406 may apply techniques to rule out permutations that are clearly not desirable. These techniques may be heuristic or non-heuristic in nature. Furthermore, the scheduler 408 that was traditionally used to determine timings for actually queued print jobs and therefore was not designed to take into account that it may need to provide a print time $t_{n,\ print}$ multiple times for a single print job, may be adapted to cache print times $t_{n,\ print}$ or even the setup times $t_{n,\ setup}$ to prevent recalculating metrics that have previously been calculated. Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A printer controller arranged to control a print engine comprising:
   a print job storage for storing print jobs to be printed, wherein a print job may comprise a deadline, the deadline specifying an ultimate time by which the print job is to be completed;
   a scheduler module for determining a print execution time for each print job in a sequence of one or more print jobs, the scheduler taking into account a setup time for a print job for setting up the print engine to print the print job given a previous print job;
   a planning module for determining a print order for to-be-printed print jobs in the print storage, arranged to submit a plurality of sequences of to-be-printed print jobs in the print job storage to the scheduler and in response receive from the scheduler for each sequence of to-be-printed print jobs the print execution times of the print jobs; wherein the planning module elects a sequence of to-be-printed print jobs for which each deadline in a print job in the sequence is met according to the print execution times of the print jobs in the sequence as provided by the scheduler.

2. The printer controller according to claim 1 wherein the previous job of the first print job in the sequence is:
   the print job currently being printed by the print engine;
   the last print job of the sequence of print jobs already planned for printing; or
   the last printed print job if the print engine is idle.

3. The printer controller according to claim 1, wherein, if none of the sequences of print jobs meets all of the deadlines of its print jobs, the planning module elects a sequence with the maximum number of deadlines met.

4. The printer controller of claim 1, wherein a print job has assigned to it:
   a criticalness property of the print job, and/or
   a weight of the print job; and
   wherein, if none of the sequences of print jobs meets all of the deadlines of its print jobs, the planning module elects a sequence with:
   the deadlines met by all print jobs designated as critical,
   the maximum sum of the weights of the print jobs with a deadline met,
   the minimum sum of the weights of the print jobs with a deadline not met, and/or the minimum sum of the weighted overdue times of the overdue print jobs.

5. The printer controller according to claim 1 wherein at least two print jobs have a group identifier assigned to it in order to group the at least two print jobs, and wherein the planning module:
only submits to the scheduler module sequences of to-be-printed print jobs wherein the at least two print jobs forming a group are consecutive print jobs in the sequence, and/or
electing comprises electing a sequence of to-be-printed print jobs with the maximum number of groups of grouped print jobs having all their print jobs meeting their deadlines according to the print execution times of the print jobs in the sequence as provided by the scheduler.

6. The printer controller according to claim 1 wherein the planning module determines which deadlines or combination of deadlines are impossible to meet.

7. The printer controller according to claim 1, wherein, the election by the planning module comprises as a secondary election criteria the sequence with the lowest total print execution time or the lowest sum of overdue time.

8. A print system comprising a print engine for forming an image on a media by depositing marking material on the media, the print system further comprising the printer controller of claim 1, wherein the printer controller is connected to the print engine and is arranged to provide a raster image to be printed to the print engine and to control the print engine in order to have the print engine form the image on the media.

9. A method for determining a print order for a plurality of print jobs, wherein a print job may comprise a deadline, the deadline specifying an ultimate time by which the print job is to be completed, the method comprising:
determining a plurality of sequences for the plurality of print jobs;
for each sequence in the plurality of sequences, determining for each print job in the sequence a print execution time, taking into account a setup time for a print job for setting up the print engine to print the print job given a previous print job;
electing a sequence of to-be-printed print jobs for which each deadline in a print job in the sequence is met according to the determined print execution times of the print jobs of the sequence.

10. The method according to claim 9 wherein the previous job of the first print job in the sequence is:
the print job currently being printed;
the last print job of the sequence of print jobs already planned for printing; or
the last printed print job.

11. The method according to claim 9, wherein, if none of the sequences of print jobs meets all of the deadlines of its print jobs, electing comprises electing a sequence with the maximum number of deadlines met.

12. The method of claim 9, wherein a print job has assigned to it:
A criticalness property of the print job, and/or
a weight of the print job; and
wherein, if none of the sequences of print jobs meets all of the deadlines of its print jobs, electing comprises electing a sequence with:
the deadlines met by all print jobs designated as critical,
the maximum sum of the weights of the print jobs with a deadline met,
the minimum sum of the weights of the print jobs with a deadline not met, and/or
the minimum sum of the weighted overdue times of the overdue print jobs.

13. The method according to claim 9, further comprising determining which deadlines or combination of deadlines are impossible to meet.

14. The method according to claim 9, wherein, the election comprises as a secondary election criteria the sequence with the lowest total print execution time or the lowest sum of overdue time.

15. A computer program product embodied on a non-transitory computer readable medium that, if executed on a processor, performs the steps of the method of claim 9.

* * * * *